April 10, 1934.  H. H. LINN  1,954,637
VEHICLE CONSTRUCTION
Filed June 4, 1931   3 Sheets-Sheet 1
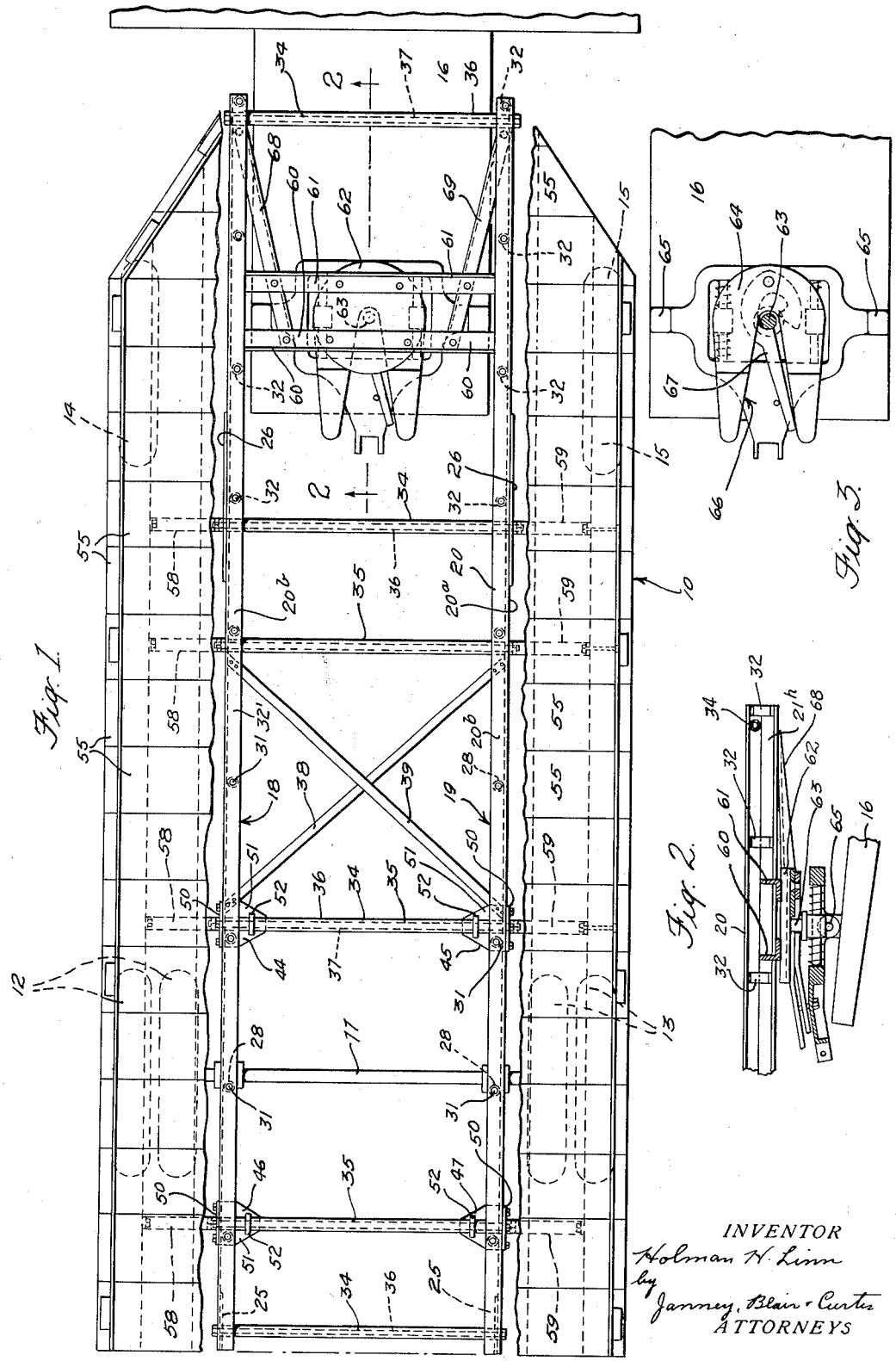
INVENTOR
Holman H. Linn
by Janney, Blair & Curtis
ATTORNEYS April 10, 1934.  H. H. LINN  1,954,637
VEHICLE CONSTRUCTION
Filed June 4, 1931  3 Sheets-Sheet 2
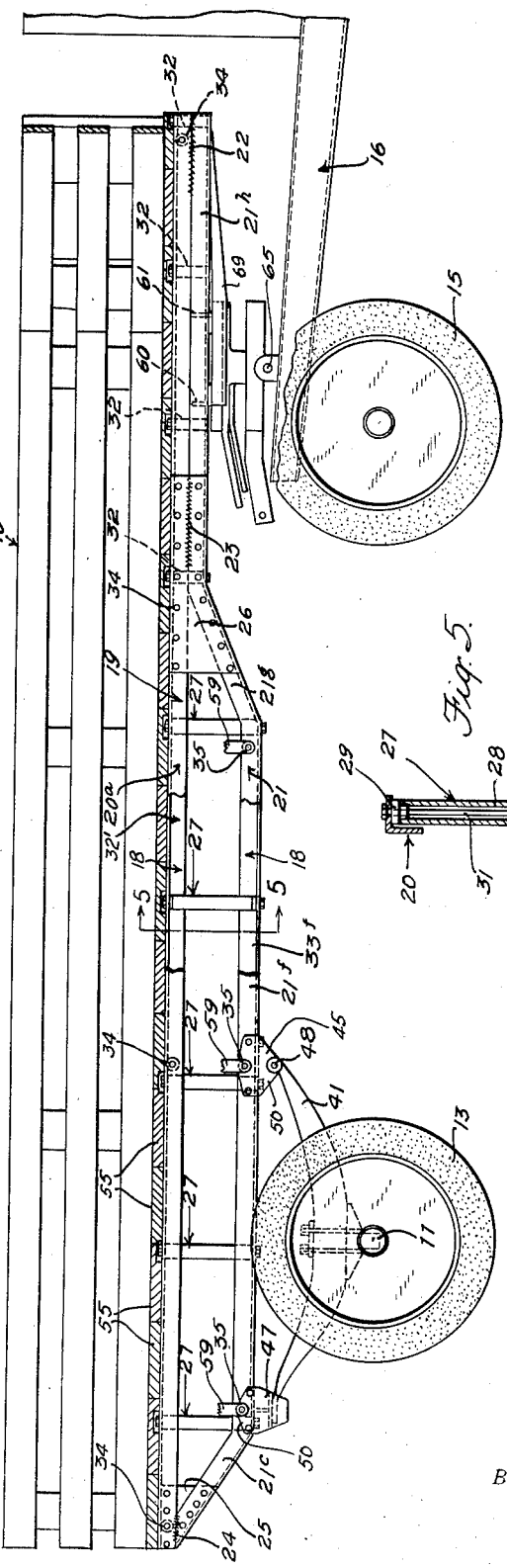
INVENTOR
Holman H. Linn
BY Janney, Blair & Curtis
ATTORNEYS

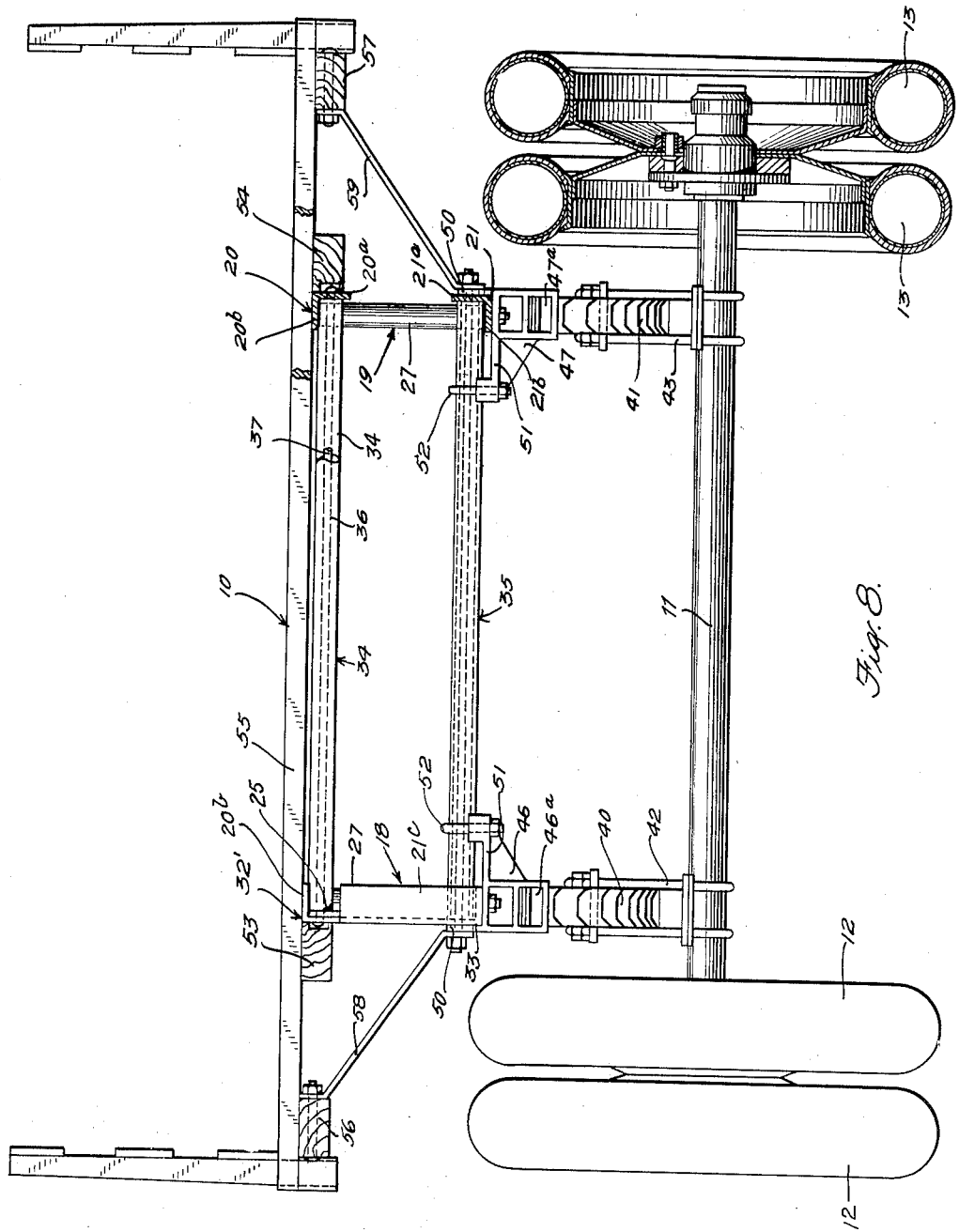

Patented Apr. 10, 1934

1,954,637

UNITED STATES PATENT OFFICE 1,954,637

VEHICLE CONSTRUCTION

Holman H. Linn, Morris, N. Y., assignor to Linn Trailer Corporation, Oneonta, N. Y., a corporation of New York Application June 4, 1931, Serial No. 542,050

15 Claims. (Cl. 280—106)

This invention relates to vehicle construction and more particularly to the construction of trailers.

One of the objects of this invention is to provide a simple, practical, strong and dependable vehicle construction well adapted to meet varying hard conditions in practical use. Another object is to provide a construction of the above mentioned character that will be of inexpensive construction capable of rapid manufacture and assembly, and adapted also for rapid and inexpensive manufacture on a quantity basis. Another object is to provide a construction of the above mentioned character which will be light yet rugged and strong and in which the ratio of pay-load to non-pay-load will be high, for a given load carrying capacity. Another object is to provide a trailer construction capable of effecting great economies in the hauling of freight or the like and capable of materially reducing the cost of haulage, be it either first cost or cost of maintenance or the like. Other objects will be in part obvious or in part pointed out hereinafter.

This invention accordingly consists in the features of construction, combination of elements, and arrangement of parts as will be exemplified in the structure to be hereinafter described, and the scope of the application of which will be indicated in the following claims.

In the accompanying drawings in which are shown several of the various possible embodiments of my invention, Figure 1 is a plan view of a preferred form of vehicle construction, certain parts being broken away to show certain other parts more clearly, Figure 2 is a vertical sectional view along the line 2—2 of Figure 1, showing also a possible form of connection between the trailer vehicle and the hauling vehicle, Figure 3 is a plan view of a possible so-called "fifth wheel" construction and connection between the trailer vehicle and the hauling vehicle, Figure 4 is a side elevation of the vehicle of Figure 1, certain parts being broken away, Figure 5 is a vertical sectional view on an enlarged scale as seen along the line 5—5 of Figure 4, through a side frame construction, Figure 6 is a side elevation of a modified form of frame construction, certain parts being omitted, Figure 7 is a vertical sectional view on an enlarged scale as seen along the line 7—7 of Figure 6, Figure 8 is an end or rear elevation of the vehicle of Figures 1 and 4 as seen from the left in the latter figures.

Similar reference characters refer to similar parts throughout the several views in the drawings.

Referring now more particularly to Figures 1, 4 and 8, there is shown, generally indicated by the reference character 10, a vehicle frame, one end of which may be supported as by an axle 11 and wheels 12—13, and the other end of which may be supported by wheels 14—15 which, in the preferred embodiment of my invention, are the rear wheels of a suitable hauling vehicle generally indicated at 16, the right hand end of the vehicle frame 10, as viewed in Figures 1 and 4, being suitably and pivotally connected to swivel with respect to the wheels 14—15.

Vehicle frame 10, which may be of any suitable or desired length, includes two longitudinally extending side frame members, generally indicated at 18 and 19, which are preferably of identical and symmetrical construction; hence, insofar as their details of construction are concerned, it will suffice to describe only one of them. In Figure 4 the side frame member 19 is clearly shown in side elevation; it includes an upper member 20 and a lower member 21, both made up preferably of angle iron, as is better shown in Figure 8. Also, as better appears from Figure 8, the vertical webs 20a and 21a of the angles 20 and 21 lie in the same vertical plane and the horizontal webs 20b and 21b form respectively the upper and lower faces of the side frame member 19.

Angle member 20 is preferably straight throughout and extends throughout the length of the vehicle frame as appears clearly from Figures 4 and 1, but angle 21 is bent to provide a portion 21c (Figure 4) extending downwardly at an angle of about 45° from the left hand end of angle 20; thence angle 21 has a portion 21f that extends underneath and parallel to and spaced from angle 20, portion 21f extending forwardly of the vehicle (to the right as viewed in Figure 4) to a point approaching the region where the wheels 14—15 swivel, whence angle 21 is bent upwardly at an angle to provide an inclined portion 21g, thus to bring the vertical web 21a of angle 21 into contact with vertical web 20a of angle 20; at this point angle 21 is again bent into parallelism with the upper angle 20 to provide a portion 20h that terminates flush with the end of upper angle 20.

The vertical webs 20a and 21a of the upper angle 20 and of the portion 21h of the lower angle 21 are in edge to edge or abutting contact throughout their length, and are held in that relation by preferred means to be more clearly described hereinafter. Included in the latter is preferably some welding, the abutting vertical webs being welded together either throughout their length of contact or throughout suitable spaced portions thereof as is indicated in Figure 4 at 22 and 23. Thus this end portion of frame member 19 is given a channel cross section.

At the contacting left hand end portions of the angles 20 and 21 (see Figure 4), the vertical web of the portion 21c of the lower angle 21 is cut so as to abut with the lower horizontal edge of the vertical web of the upper angle 21, these abutting portions of these two webs being welded together as is indicated at 24. Also a suitable shaped plate or gusset 25 is fitted into the angle formed by the horizontal webs at this end of the frame member and is suitably secured to the angles, as by riveting to the vertical webs thereof, all as is better shown at the left hand portion of Figure 4.

A plate or gusset 26 shaped as is indicated in Figure 4 overlaps the outer or side faces of the vertical webs of the angles 20 and 21 at the junction of the portions 21g and 21h with the upper angle 20, being suitably secured to the two angles as by riveting to the vertical webs thereof. Thus this junction point is strongly reinforced and strengthened.

The portion 21f of the lower angle 21 (see Figure 4) is held in substantial parallelism with the upper angle 20 by a series of suitably spaced vertically extending members 27; in Figure 4 five such members are shown by way of illustration. These members 27 are compression members, but they are also constructed to withstand tensional strains. Also they are all preferably of the same construction and hence it will suffice to describe in detail one of them.

The members 27 comprise a steel tube 28 (see Figure 5), squared off at its ends, and having fitted into the open ends thereof stepped washers 29 and 30 suitably shaped as is shown in Figure 5 to provide exposed surfaces that will be parallel to each other. The tube 28 with the washers 29 and 30 assembled with respect thereto is snugly fitted in between the horizontal webs 20b and 21b of the upper and lower angles 20 and 21 (see Figures 5, 8 and 4), whence a bolt 31 is passed through these webs and through the washers and the tube 28, and securely tightened up. Thus the above mentioned portions of the upper and lower webs 20 and 21 are not only held in spaced relation, but also are dependably held against being thrown out of alignment with each other, the members 27 dependably holding the horizontal webs of the angles in their intended parallel relation.

The inclined portions 21c and 21g (see Figure 4) function also to prevent relative longitudinal displacement of the portion 21f of the lower angle with respect to the upper angle 20, but this action is materially contributed to by the devices or members 27 which, because of the connections thereof to the horizontal webs of the two angles, also resist any tendency for such relative longitudinal displacement.

Members of a construction similar to the devices 27 above described but shorter in length also take part in maintaining the desired and intended inter-relation, above described, between the horizontal and right hand end portion 21h of the lower angle 21 with respect to the upper angle 20; these shorter devices are indicated at 32 and in Figure 4 I have illustratively shown four such longitudinally spaced devices.

The side frame member 21 will thus be seen to be built up of structural steel parts of standard section and of parts otherwise easily obtainable or fabricated, such as the bolts or the gussets, and the frame member, for a given length and load carrying capacity, is found to be exceedingly light, strong and inexpensive. The side frame member 18 (Figures 1 and 8) is of a construction complementary to that above described in detail as clearly appears from Figures 1 and 8, frame member 18 (see Figure 8) having therefor upper and lower angles 32 and 33 complementary to the upper and lower angles 20 and 21 of frame member 19.

The two frame members 18 and 19 are held in spaced relation (see Figures 1 and 8) by a series of longitudinally spaced members 34, shown in Figures 1 and 4 as four in number, and coacting with the upper angle members 32 and 20, and by similar members 35, shown in Figures 1 and 4 as three in number, coacting with the depressed horizontal portions 21f and 33f (Figure 4) of the lower angles 33 and 21 respectively.

Members 34 and 35 are of a construction generally similar to that above described in connection with members 27 (see Figure 5), and they include (see now Figure 8) a steel tube 36 and a bolt 37, the former, preferably provided at its ends with washers like the washers 29 and 30 of Figure 5, being fitted snugly and squarely in between the vertical webs of the side angle irons and the latter securely clamping these vertical webs squarely against the squared ends of the tube 36.

Members 33 and 35 thus not only hold the side frame members 18 and 19 in spaced relation, but also resist twisting or other strains that tend to throw the frame members out of parallelism with each other or out of exact coinciding juxtaposition; this action is in part achieved because of the way in which the members 34 and 35 squarely hold the horizontal webs of the angles. Any tendency to twist the frame about the longitudinal axis of the vehicle or about a vertical axis is accompanied by a tendency to force the members 35 and 37 out of true right-angled relation with respect to the vertical webs of the angles to which they are so securely attached; but the attachment is of such a nature that these tendencies are dependably resisted and prevented from assuming a consequential magnitude.

If desired, and preferably, I cross-brace side frame members 18 and 19 by tension members or straps 38—39 (see Figure 1), the cross-braces 38 and 39 forming diagonals having their ends secured in any suitable manner, as by riveting, preferably to the horizontal webs of the angles. These cross-bracing tension members, which preferably are also constructed to resist compression, contribute toward preventing one side frame member from being thrown out of exact juxtaposition with respect to the other.

Considering now the manner in which the axle 11 (Figures 4 and 8) is related to the vehicle frame above described, there are secured to the axle 11 leaf springs 40—41, as by spring clips or U-bolts and plates 42—43 respectively; the forward ends of the springs are pivotally connected to what might be termed front spring hangers 44 and 45 (see Figure 1) secured to the frame members 18 and 19 respectively, and the rear ends of the springs 40—41 are slidably received within suitable recesses in what might be termed the rear spring hangers 46 and 47 respectively (see Figures 1 and 8). The pivotal connection of the springs to the front spring hangers 44 and 45 may be achieved by way of suitable bolts, one of which is shown in Figure 4 at 48, while the recesses in the rear spring hangers 46 and 47 for receiving the rear ends of the springs 40 and 41 respectively are clearly shown in Figure 8 at 46a and 47a respectively.

These four spring hangers are otherwise generally of a similar construction. Each has a vertical plate-like portion 50 adapted to rest against the vertical web of the lower angle of the side frames (see Figure 8), a horizontal portion 51 upon which the horizontal web of the lower angle of the side frame members rests, the portion 51 being extended inwardly toward the center of the vehicle frame for a substantial distance.

These spring hangers 44, 45, 47, 46 (see Figures 1 and 4) are secured to the side frame members 18 and 19 by the bolts 31 of vertical spacing members 27 (see Figure 5) and by the bolts 37 of the horizontal spacing members 35 (see Figure 8); thus these spring hangers are strongly and securely clamped to the side frame members 18 and 19 while, if desired, additional bolts or rivets may be used to secure the hangers to the angles 33 and 21 of the side frame members. Thus any tendency for the reactions of the springs either to the load or to the irregularities in the road bed that tend to twist the vehicle frame are quickly resisted by the action of the spacing members 27 and 35. Furthermore, the inwardly extended arm portions 51 of the four spring hangers extend inwardly toward the center of the vehicle frame but in line with the horizontal spacing members 35 (see Figures 8 and 1), and these arm portions 51 are secured to the spacing members 35 by U-bolts 52. Thus these various parts are made to reinforce one another and do so at the points where the load that is to be transmitted to the wheels is practically concentrated.

However, I secure still further bracing of the otherwise very light yet strong frame construction above described. Referring now to Figure 8, I provide two beams 53 and 54, of wood, extending throughout the length of the vehicle frame, one on the outside face of each side frame member 18 and 19; these beams 53—54 may be secured to the side frame members as by bolting to the vertical webs of the upper angles 32 and 20, and to them is secured the flooring or planking 55 which, as is better shown in Figures 1 and 4, extends crosswise of the vehicle frame. The planking 55 may be of any length commensurate with the ultimate width of the vehicle body, and hence may have a substantial overhang as is better shown in Figure 8.

Extending underneath the planking 55 and along the outer end portions thereof are two beams 56 and 57 (Figure 8) and the planking 55 is secured also to these beams. At a suitable number of longitudinally spaced points illustratively three in number, I provide pairs of braces 58—59 (see Figure 8). These braces are both compression and tension members and at their upper ends they are bolted respectively to the side beams 56—57 and at their lower and inner ends they are secured to the side frame members 18—19 by the bolts 37 of the three horizontal spacing members 35 that extend between the lower parallel portions 33f and 21f of the lower angles 33 and 21.

The braces 58—59, coacting with the flooring or planking 55, coact with other features of construction, above described, to prevent the side frame members 18 and 19 from tilting from the position shown in Figure 8, thus assisting in maintaining a right angle relation between the horizontal spacing members 34—35 and vertical spacing members 27 as viewed in Figure 8. The braces 58—59 also assist in supporting the overhang and the load carried by the latter and contribute also toward transmitting directly to the spring hangers part of the load carried by the vehicle, for, it will be noted, two of the pairs of braces 58—59 are secured at their lower ends to the spring hangers (see Figures 4 and 1).

Any suitable form of body construction may be attached to or built upon the flooring 55 and in the drawings a possible or illustrative box construction is indicated.

The forward or right hand end portion of the vehicle is provided with a cross member extending between the channeled forward end portions of the side frames 18 and 19; this member may comprise two longitudinally spaced angles 60—61 secured at their ends, as by riveting, bolting or welding, to either or both of the upper and lower angles of the two side frame members 18 and 19 (see Figure 4) and to the underside of members 60—61 (see now Figure 2) is secured a disk-like plate 62 provided with a headed kingpin 63. Any suitable means may be provided for coupling the kingpin 63 to the wheels that are to support the forward end of the vehicle 10 or to the hauling vehicle 16.

For example, the hauling vehicle 16 may carry, so as to pivot about a horizontal axis 65 (see also Figure 4), a slotted plate-like member 64 upon which the disk-like plate 62 of the vehicle may rest, the slot 66 (see Figure 3) permitting the kingpin 63 to ride up to the inner end of the slot 66 whence a suitable hook 67 (Figure 3) manually operated may be made to engage in back of the kingpin 63. Thus vehicle 10 is connected to the hauling vehicle 16 to permit swiveling about both a vertical and horizontal axis.

Referring now to Figure 1, members 60 and 61, preferably of angle cross section as above noted, are of sufficient strength to resist bending, particularly bending that might tend to take place due to the load that these members transmit from the side frames 18 and 19 to the disk plate 62; the latter, however, is preferably of substantial transverse extension and materially reinforces members 60—61. However, to safeguard members 60—61 against the effects of suddenly applied stress due, for example, to sudden starting or stopping of the hauling vehicle, members 68 and 69 (see Figure 1) are provided; these members, preferably of angle cross section so as to function both as compression and tension members, are secured at their forward ends to the ends of the side frames 18 and 19 and at their rear ends to the cross members 60—61 at points in the latter approaching the center thereof.

In Figures 6 and 7 I have illustrated a possible modification of certain features of the construction above described, and under certain circumstances I may find it desirable to employ vertical spacing members for the upper and lower angles of the side frames 18 and 19 which consist of appropriately dimensioned sections of angle iron. Thus, for example, the vertically spaced portions of the upper and lower angles of the side frames are connected by sections 70 at points where the members 27 of Figure 4 are connected. Members 70 (see now Figure 7) are cut to a length so as to be snugly received between the horizontal webs of the spaced angles of the side frames and are chamfered as at 71 so that the one web 70a may rest snugly against the vertical webs of the angles of the side frames and the upper and lower edges 70b and 70c, squared off and in exact parallelism, of the remaining web 70f of member 70 may rest snugly against the horizontal webs of the upper and lower angles of the side frames. Members 70 are welded or riveted or both to the angles of the side frames and hold these angles against being thrown out of their intended alignment. Similar but shorter vertical spacing angles 72 are similarly fitted and similarly secured to the upper angle 20 and the portion 21h of the lower angle 21.

It will thus be seen that there has been provided in this invention a construction in which the various objects hereinabove pointed out together with many thoroughly practical advantages are successfully achieved. The vehicle construction is light but very strong and is capable of dependably carrying loads that, in proportion to the weight of vehicle itself, are very heavy. In fact by such features as those described above, I have been able vastly to diminish the dead weight of the vehicle or trailer but without diminishing its load carrying capacity. For example, I have been able to reduce the weight per se of the vehicle, for a given load carrying capacity, greatly in excess of one-half of the weight of vehicles of the same load carrying capacity now available. For example, where trailers of five tons carrying capacity now available weigh anywhere from 2,000 pounds to over 3,000 pounds, I am enabled to provide in accordance with certain features of my invention, a trailer capable of carrying five tons but weighing as little as 900 pounds. Moreover, these advantages I am enabled to achieve without increasing the cost of production but rather such advantages are accompanied by decreased cost of production. The construction lends itself readily to quantity production and utilizes light but strong and readily available and, in fact, standard structural steel material.

Such advantages as those noted above are moreover of far reaching effect for by diminishing the ratio of non-pay-load to pay-load, the cost of transportation or of haulage of freight or the like is greatly lessened.

Moreover the construction will be seen to be well adapted to meet the varying conditions of hard practical use.

As many possible embodiments may be made of the above invention, and as many changes may be made in the embodiment above set forth, it is to be understood that all matter hereinabove set forth or shown in the accompanying drawings is to be interpreted as illustrative and not in a limiting sense.

I claim:

1. In vehicle construction, in combination, a vehicle frame having supporting wheel means at its rear end and having supporting wheel means at its front end, the latter means being adapted to swivel, said frame including side frame members each made up of two facing angles having their vertical webs contacting and secured together throughout a portion adjacent the forward end of the frame, the lower of the two angles being spaced from the upper angle throughout a rear portion of said frame, spacing members connecting the two angles and connected to the latter to prevent tilting of one angle with respect to the other, said spacing members each comprising a tubular member that is squared off to abut the horizontal webs of said angles and fitted into the latter and bolt members passing through said horizontal webs and through the tubular members and clamping the horizontal webs and the tubular members together, and means for holding the side frame members in spaced relation.

2. In vehicle construction, in combination, a vehicle frame having supporting wheel means at its rear end and having supporting wheel means at its front end, the latter means being adapted to swivel, said frame including side frame members each made up of two facing angles having their vertical webs contacting and secured together throughout a portion adjacent the forward end of the frame, the lower of the two angles being spaced from the upper angle throughout a rear portion of said frame, tension and compression members for holding the spaced portions of said angles apart and for preventing tilting of one angle with respect to the other, each compression member comprising a hollow tube-like member received between the horizontal webs of said angles for transmitting the load from one angle to the other and said tension members comprising clamping members passing through the horizontal webs and through the tubular members for resisting forces tending to move one angle away from the other, and means including diagonal tension members for holding said side frames in spaced relation and for preventing displacement of one in a direction lengthwise of the other.

3. In vehicle construction, in combination, a vehicle frame having supporting wheel means at its rear end and having supporting wheel means at its front end, the latter means being adapted to swivel, said frame including side frame members each made up of two facing angles having their vertical webs contacting and secured together throughout a portion adjacent the forward end of the frame, the lower of the two angles being spaced from the upper angle throughout a rear portion of said frame, tubular members fitted in between the horizontal webs of said angles and secured thereto, tubular members extending horizontally between the vertical webs of the upper angles and secured thereto, and tubular members fitted between the vertical webs of the lower angles and secured thereto, said second and third-mentioned tubular members holding said side frame members in spaced relation and forming with said first-mentioned tubular members substantially rectangular trusses extending transversely of the vehicle frame, the angles of the latter serving to interconnect the members of the truss.

4. In vehicle construction, in combination, a vehicle frame including side frame members each made up of vertically spaced structural steel sections having horizontal webs, tubular members longitudinally spaced along the side frame members and fitted in between the horizontal webs of the structural steel sections thereof, bolts passing through the horizontal webs and through said tubular members for clamping the sections and tubular members together, an axle, and means including said bolts for securing said axle from said frame, said last-mentioned means including a bracket-like arm extending in the direction of one of said tubular members and in engagement with the latter at a point spaced from the end of the tubular member.

5. In vehicle construction, in combination, a vehicle frame including side frame members each made up of vertically spaced structural steel sections having horizontal webs, tubular members longitudinally spaced along the side frame members and fitted in between the horizontal webs of the structural steel sections thereof, bolts passing through the horizontal webs and through said tubular members for clamping the sections and tubular members together, an axle and springs, and spring hangers for securing the springs to the vehicle frame, said spring hangers being engaged by certain of said bolts.

6. In vehicle construction, in combination, a vehicle frame including side frame members each made up of vertically spaced structural steel sections having horizontal webs and vertical webs, tubular means engaging the horizontal webs for holding the sections vertically spaced, tubular means engaging the vertical webs and bolts passing through said webs and said tubular means for holding the side frames spaced from each other, cross-beams carried by said spaced side frame members and projecting laterally thereof, and braces extending from said cross-beams to the lower sections and held in place by said bolts.

7. In vehicle construction, in combination, a vehicle frame including side frame members each made up of vertically spaced structural steel sections having horizontal webs and vertical webs, tubular means engaging the vertical webs of said steel sections and bolts passing through said tubular means and said vertical webs for holding the side frames spaced apart, tension and compression members engaging the horizontal webs for holding the sections of the side frame vertically spaced, transverse load-supporting members carried by said spaced side frame members and projecting laterally thereof, and braces extending from the projecting portions of said load-supporting members and into engagement with and held by certain of said bolts.

8. In vehicle construction, in combination, a vehicle frame including side frame members each made up of vertically spaced structural steel sections having vertical webs, means for holding the sections of the side frame vertically spaced from each other, tubular means interposed between the vertical webs of the side frames, bolts passing through the vertical webs and through the tubular members, transverse load-supporting members carried by said spaced side frame members and projecting laterally thereof, and braces extending from the projecting portions of said load-supporting members to the lower sections of said side frame members and held in place at their lower ends by said bolts.

9. In vehicle construction, in combination, a vehicle frame including side frame members each made up of vertically spaced structural steel sections having horizontal webs, tubular members longitudinally spaced along the side frame members and fitted in between the horizontal webs of the structural steel sections thereof, bolts passing through the horizontal webs and through said tubular members for clamping the sections and tubular members together, cross spacing members extending between said steel sections, an axle and springs, spring hangers for securing the springs to said frame, and means for securing said hangers in place, said securing means including certain of said bolts and including also bolt means acting also to secure said cross-bracing members to said frame members.

10. In vehicle construction, in combination, a vehicle frame including side frame members made up of vertically spaced steel sections having horizontal webs and vertical webs; means for holding the sections of the side frame members vertically spaced comprising tubular means interposed between the horizontal webs of the sections and bolts passing through the horizontal webs and through the tubular means; means for holding the side frame members in spaced relation comprising tubular means interposed between the vertical webs of the side frame and bolts passing through the vertical webs and through the tubular means; and angle and springs; and spring hangers for securing the springs to said frame, said spring hangers being held in assembled relation to the side frame members by certain of said bolts that pass through the horizontal webs and also by certain of the bolts that pass through the vertical webs.

11. In vehicle construction, in combination, a vehicle frame including side frame members made up of vertically spaced steel sections having horizontal webs and vertical webs; means for holding the sections of the side frame members vertically spaced comprising tubular means interposed between the horizontal webs of the sections and bolts passing through the horizontal webs and through the tubular means; means for holding the side frame members in spaced relation comprising tubular means interposed between the vertical webs of the side frame and bolts passing through the vertical webs and through the tubular means, and wheels means secured to said frame by certain of said first-mentioned bolts and by certain of said second-mentioned bolts.

12. In vehicle construction, in combination, a vehicle frame including side frame members made up of vertically spaced steel sections having horizontal webs and vertical webs; means for holding the sections of the side frame members vertically spaced comprising tubular means interposed between the horizontal webs of the sections and bolts passing through the horizontal webs and through the tubular means; means for holding the side frame members in spaced relation comprising tubular means interposed between the vertical webs of the side frame and bolts passing through the vertical webs and through the tubular means, an axle; and means securing said axle to said frame and including brackets secured to said frame members by certain of said bolts, and extensions toward the center of the frame on the brackets, and means securing said extensions to one of said tubular means that holds said frame members in spaced relation.

13. In vehicle construction, in combination, a vehicle frame including side frame members made up of vertically spaced steel sections having horizontal webs and vertical webs; means for holding the sections of the side frame members vertically spaced comprising tubular means interposed between the horizontal webs of the sections and bolts passing through the horizontal webs and through the tubular means; means for holding the side frame members in spaced relation comprising tubular means interposed between the vertical webs of the side frame and bolts passing through the vertical webs and through the tubular means, an axle; and means securing said axle to said frame and including brackets secured to said frame members by certain of said bolts, and extensions on said brackets, said extensions terminating adjacent one of said tubular means, and means securing the extensions to the tubular means along which it extends.

14. In vehicle construction, in combination, a vehicle frame having supporting wheel means at its rear end and having supporting wheel means at its front end, the latter means being adapted to swivel, said frame including side frame members each made up of two facing angles having their vertical webs contacting and secured together throughout a portion adjacent the forward end of the frame, the lower of the two angles being spaced from the upper angle throughout a rear portion of said frame, means including a cross-member extending between and secured to the lower of the two angles for holding the side frame members apart, an axle, springs for said axle, and brackets engaging the said two lower angles, said brackets having connection with said springs and each having a rigid arm extending inwardly toward the center of the frame, and means for anchoring said rigid arms to said cross-member.

15. In vehicle construction, in combination, a vehicle frame having supporting wheel means at its rear end and having supporting wheel means at its front end, the latter means being adapted to swivel, said frame including side frame members each made up of two facing angles having their vertical webs contacting and secured together throughout a portion adjacent the forward end of the frame, the lower of the two angles being spaced from the upper angle throughout a rear portion of said frame, tension and compression members for holding the spaced portions of said angles apart and for preventing tilting of one angle with respect to the other, tension and compression cross-members for holding said side frames spaced apart, an axle, and means for securing said axle to said frame and including brackets having inwardly directed arms, means for connecting said brackets to said first-mentioned tension and compression members, and means connecting said arms to a cross-member.

HOLMAN H. LINN.